US010005545B2

(12) United States Patent
Alderman et al.

(10) Patent No.: US 10,005,545 B2
(45) Date of Patent: Jun. 26, 2018

(54) AIRCRAFT WING RIB

(71) Applicant: AirbusGroup Limited, London (GB)

(72) Inventors: James Alderman, Chippenham (GB); Stephen Rolston, Bristol (GB); Jonathan Meyer, Bristol (GB)

(73) Assignee: AirbusGroup Limited, London (GB)

( * ) Notice: Subject to any disclaimer, the term of this patent is extended or adjusted under 35 U.S.C. 154(b) by 182 days.

(21) Appl. No.: 14/964,032

(22) Filed: Dec. 9, 2015

(65) Prior Publication Data

US 2016/0159464 A1 Jun. 9, 2016

(30) Foreign Application Priority Data

Dec. 9, 2014 (GB) .................................. 1421907.5

(51) Int. Cl.
*B64C 21/06* (2006.01)
*B64C 3/18* (2006.01)

(52) U.S. Cl.
CPC .............. *B64C 21/06* (2013.01); *B64C 3/187* (2013.01); *B64C 2230/04* (2013.01); *B64C 2230/22* (2013.01); *Y02T 50/166* (2013.01)

(58) Field of Classification Search
CPC . B64C 2230/04; B64C 2230/22; B64C 3/187; B64C 21/06
See application file for complete search history.

(56) References Cited

U.S. PATENT DOCUMENTS

| | | | |
|---|---|---|---|
| 2,297,540 A | 9/1942 | Driscoll | |
| 2,867,392 A | 1/1959 | Lear | |
| 3,974,986 A | 8/1976 | Johnstone | |
| 5,167,387 A * | 12/1992 | Hartwich | B64C 21/025 244/200 |
| 5,263,667 A * | 11/1993 | Horstman | B64C 21/06 244/130 |
| 5,366,177 A * | 11/1994 | DeCoux | B64C 21/06 244/201 |
| 5,542,630 A * | 8/1996 | Savill | B63B 1/34 244/200 |
| 5,899,416 A * | 5/1999 | Meister | B64C 21/06 244/207 |

(Continued)

FOREIGN PATENT DOCUMENTS

| | | |
|---|---|---|
| EP | 0436243 A2 | 7/1991 |
| EP | 2634467 A1 | 9/2013 |
| GB | 2440133 | 1/2008 |

OTHER PUBLICATIONS

Niu, Michael Chun-Yung (1999). Airframe Structural Design—Practical Design Information and Data on Aircraft Structures (2nd Edition). (pp. 247, 258-259). AD Adaso/Adastra Engineering LLC. Online version available at: http://www.knovel.com/web/portal/browse/display?_EXT_KNOVEL_DISPLAY_bookid=4695&VerticalID=0.*

(Continued)

*Primary Examiner* — Timothy D Collins
*Assistant Examiner* — Michael B Kreiner
(74) *Attorney, Agent, or Firm* — Nixon & Vanderhye P.C.

(57) ABSTRACT

There is disclosed an aircraft wing rib comprising a structural rib section to which a wing skin can be attached; and a suction conduit to which, in use, a negative pressure can be applied so as to cause air to be drawn through suction holes provided in the outer surface of the wing skin. There is also disclosed an aircraft wing including such a wing rib.

24 Claims, 5 Drawing Sheets

(56) References Cited

U.S. PATENT DOCUMENTS

| | | | |
|---|---|---|---|
| 6,119,978 A | 9/2000 | Kobayashi et al. | |
| 6,415,510 B2 * | 7/2002 | Mertens .................... | B64C 3/00 |
| | | | 244/117 R |
| 2012/0132755 A1 | 5/2012 | Petit et al. | |

OTHER PUBLICATIONS

May 21, 2015—(GB) Search Report—App 1421907.5—3 pages.
Apr. 6, 2016—(EP) Extended European Search Report—Application No. 15198331.9—8 pages.

* cited by examiner

AIRCRAFT WING RIB

CROSS-REFERENCE TO RELATED APPLICATIONS

The present application claims priority to GB 1421907.5 filed on 9 Dec. 2014, which is hereby incorporated by reference in its entirety for any and all non-limiting purposes.

BACKGROUND

The present disclosure relates to an aircraft wing rib, in particular, although not exclusively, to an aircraft wing rib having an integrated suction conduit which can form part of a hybrid laminar flow control (HLFC) system. The disclosure also relates to an aircraft wing and an aircraft.

There is continued focus in the aviation industry on reducing the fuel consumption and emissions of aircraft. It is possible to reduce fuel consumption and emissions by reducing the airframe drag, which can be achieved by ensuring laminar flow over the windswept surfaces of the wings. The wing shape can be designed to help maintain a laminar boundary layer. However, as the cruise Mach number increases, for example beyond Mach 0.70, it becomes increasingly difficult for the wing shape alone to maintain a laminar boundary layer. This is due at least in part to the increased Reynolds number and sweep.

Hybrid laminar flow control (HLFC) systems have been considered for aircraft in an attempt to stabilise the laminar boundary layer, thereby delaying boundary layer transition. These systems typically work by applying a negative pressure to the windswept surfaces. The term "negative pressure" in this context refers to a pressure less than the pressure at the windswept surface (i.e. negative with respect to a zero-referenced pressure at the windswept surface). It is known to apply a HLFC system to a fin in order to stabilise the laminar boundary layer. However, incorporating an HLFC system into a wing presents more challenges as space within the wing is typically limited as other systems such as high-lift/shielding devices and/or ice protection systems also must also be accommodated in this region.

Embodiments aim to address at least some of the above problems to some extent.

SUMMARY

According to an aspect there is provided an aircraft wing rib, comprising: a structural rib section to which a wing skin can be attached; and a suction conduit to which, in use, a pressure can be applied so as to cause air to be drawn through suction holes provided in the outer surface of the wing skin. The pressure may be referred to as a negative pressure since it is less than the pressure at the outer surface of the wing skin (i.e. negative with respect to a zero-referenced pressure at the outer surface of the wing skin). The pressure may also be referred to as a reduced pressure, a low pressure, or a suction pressure (i.e. it causes suction at the outer surface of the wing skin). The wing rib may be arranged to form part of a hybrid laminar flow control system. The suction conduit may be an integral suction conduit integral with the structural rib section. The suction conduit may be provided in the leading edge region of the wing rib.

The suction conduit may have a port arranged to be fluidically coupled to a source of negative pressure. The port could be arranged to be directly or indirectly coupled to a source of negative pressure. The suction conduit may comprise an open channel which in use is closed by the attachment of the wing skin to the structural rib section. The open channel may be a U-shaped channel. The open channel may be defined by the structural rib section. The open channel may be provided in the outer surface of the structural rib section. The open channel may be provided on at least an upper surface of the structural rib section. The open channel may extend in a direction substantially parallel to a plane within which the length direction of the wing rib lies. The open channel may be provided in a leading edge region of the wing rib.

The wing rib may be a leading edge wing rib, or a rib that extends from the leading edge to the trailing edge, with the suction conduit provided in a leading edge region.

The suction conduit may further comprise a duct in fluid communication with the open channel and arranged to be fluidically coupled to a source of negative pressure. The duct may extend in a direction substantially parallel to the width direction of the wing rib. The duct may extend through the structural rib section. The duct may comprise at least one duct coupling to which a corresponding coupling of a suction pipe can be connected. The duct may comprise two duct couplings, on either side of the structural rib section. The duct coupling or couplings may be the ends of the duct.

The structural rib section may comprise at least one wing skin flange for attaching the wing skin to the structural rib section. There may be two laterally spaced wing skin flanges. The open channel may be located or defined between the two flanges. The wing rib may be arranged to be attached to at least one wing spar. The structural rib section may be provided with a flange for attaching it to a spar, such as the front spar.

The wing rib may be an integrally formed component. The wing rib may be manufactured by an additive manufacturing process.

According to another aspect there is provided an aircraft wing comprising: at least one wing spar; a plurality of wing ribs, each in accordance with any statement herein, attached to the at least one wing spar; and a wing skin attached to the wing ribs and having a plurality of suction holes in an outer surface thereof, each suction hole being in fluid communication with the suction conduit of at least one wing rib. The aircraft wing may be provided with a hybrid laminar flow control system at least partly located in the leading edge region of the wing. The wing ribs may extend in a direction perpendicular to the direction of extent of the spar. In other embodiments the wing ribs may extend at an angle to the direction of extent of the spar, such as up to +/−30°. The suction conduits and/or open channels may be located in a leading edge region of the wing, fore of the wing box.

The suction conduits of the wing ribs may be in fluid communication with one another. The suction conduits of each adjacent pair of wing ribs may be fluidically coupled together with a suction pipe section located between adjacent wing ribs. The suction pipe sections and the ducts may form a continuous suction channel which can be fluidically coupled to a source of pressure. The source of pressure may be referred to as a source of negative pressure since it is arranged to generate or be at a pressure less than the pressure at the outer surface of the wing skin so as to cause suction. Each end of each suction pipe section may be provided with a coupling which is coupled to a respective duct coupling. The couplings of each suction pipe may be flexible or may comprise a flexible region. Each suction pipe section may be flexible along at least a part of its length.

The wing skin may comprise an outer layer and an inner layer defining at least one suction chamber therebetween. The suction holes may be provided in the outer layer. The suction holes may be distributed over a leading edge region of the wing. The inner layer may comprise a plurality of metering holes, each opening into a suction conduit. The wing skin may define a plurality of separated suction chambers, each suction chamber extending in the spanwise direction. Each suction chamber may be provided with a plurality of metering holes in the inner layer, each metering hole opening into a separate suction conduit. A plurality of suction holes may open into each suction chamber. The number of suction holes may be greater than the number of metering holes. Components of a high-lift/shielding device and/or an ice protection system may be located in the leading edge region of the wing, fore of the wing box.

According to another aspect there is provided an aircraft comprising an aircraft wing rib or an aircraft wing in accordance with any statement herein, and a source of pressure fluidically coupled to the or each suction conduit. The source of pressure may be referred to as a source of negative pressure. The source of pressure may be a turbocompressor, for example. In other embodiments the source of pressure may be a region of low pressure on the airframe, or may be from the gas turbine engine through a venture, for example. The aircraft may be provided with a hybrid laminar flow control system.

Certain embodiments may comprise any combination of the features and/or limitations referred to herein, except combinations of such features as are mutually exclusive.

BRIEF DESCRIPTION OF THE DRAWINGS

Embodiments will now be described, by way of example, with reference to the accompanying drawings, in which.

DETAILED DESCRIPTION

Figure 1:
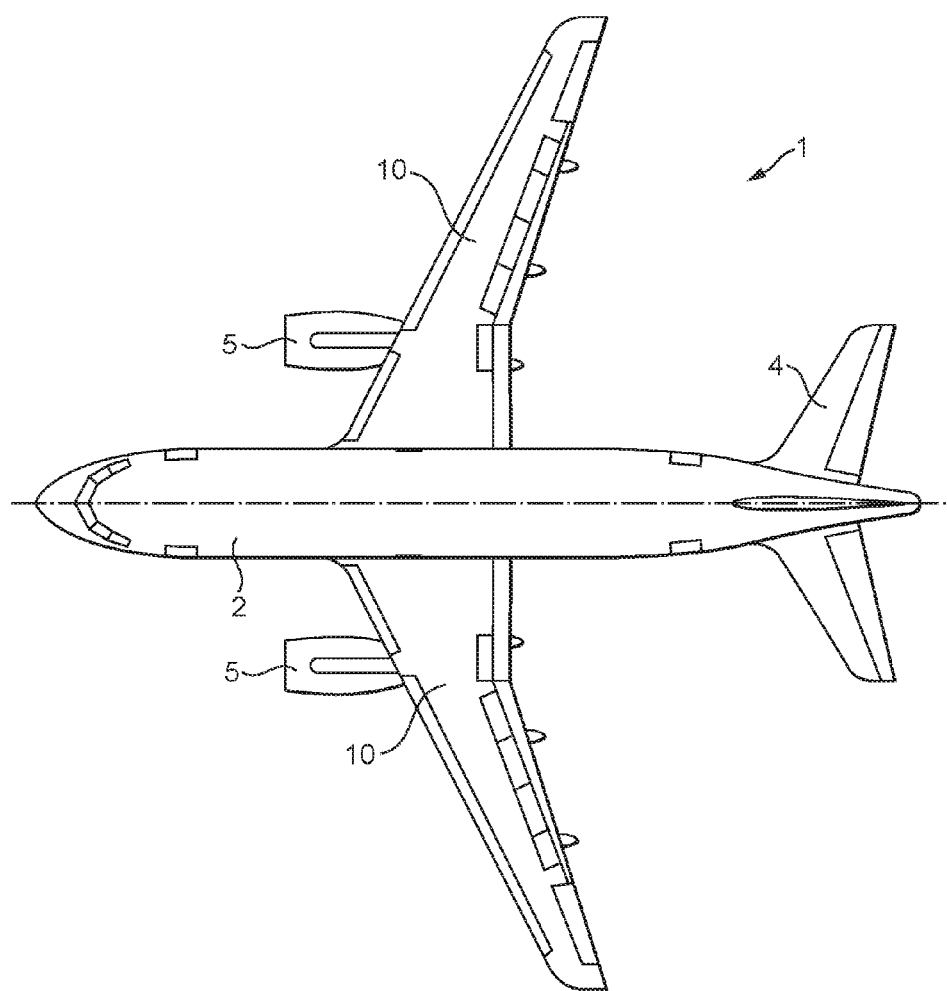
FIG. 1 schematically shows a top view of a passenger aircraft.

FIG. 1 shows a passenger aircraft having a fuselage 2, wings 10, a tailplane 4 and engines 5. It will be appreciated that the aircraft of FIG. 1 is merely one example of an aircraft.

Figure 2:
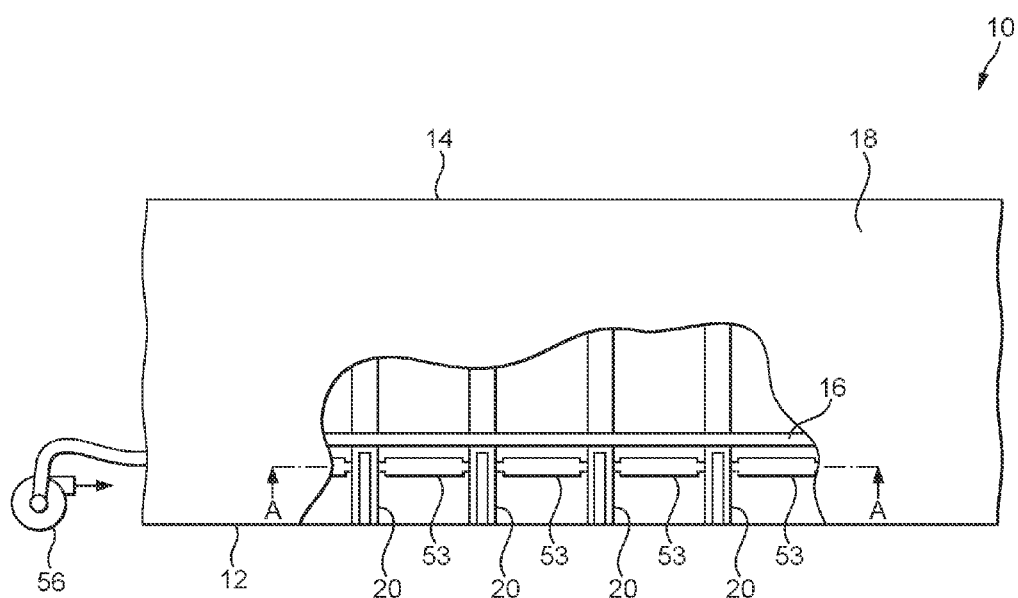
FIG. 2 schematically shows a plan view of a section of an aircraft wing with a part of the wing skin cut away.

FIG. 2 shows a section of an aircraft wing 10 having a leading edge 12 and a trailing edge 14. The wing 10 comprises a structural framework having two wing spars 16 (only one is shown in FIG. 2) and a series of wing ribs arranged side-by-side and laterally spaced from one another. The structural framework comprises leading edge wing ribs 20 attached to the leading edge spar 16 and extending in a direction substantially perpendicular to the direction of extent of the spar 16. The structural framework of the wing 10 is covered by a wing skin 18 including stringers which is supported by the spars 16 and ribs 20 A section of the wing skin 18 has been cutaway in FIG. 2 to show the structural framework. As will be explained in detail below, there is provided a hybrid laminar flow control (HLFC) system for applying suction to the wing skin surface in the region of the leading edge so as to stabilise the laminar boundary layer and delay boundary layer transition.

Figure 3:
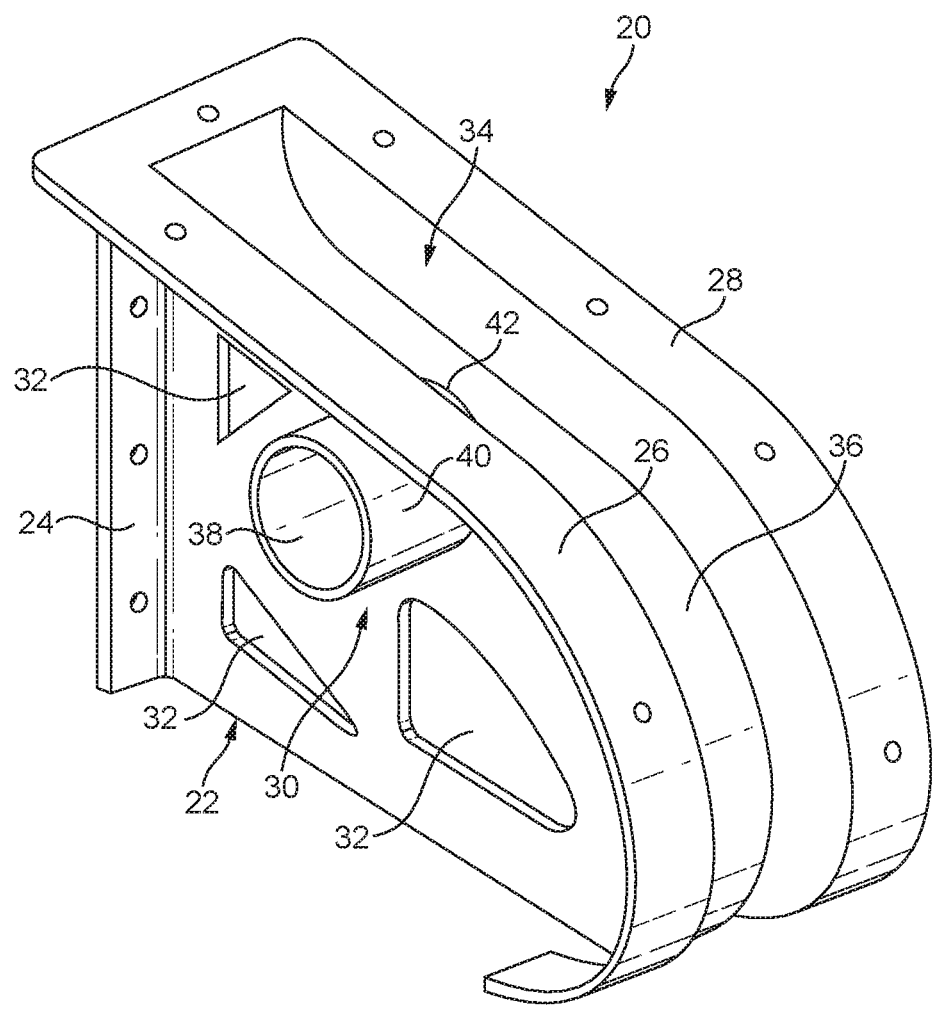
FIG. 3 schematically shows a perspective view of a wing rib of the wing of FIG. 1.
Figure 4:
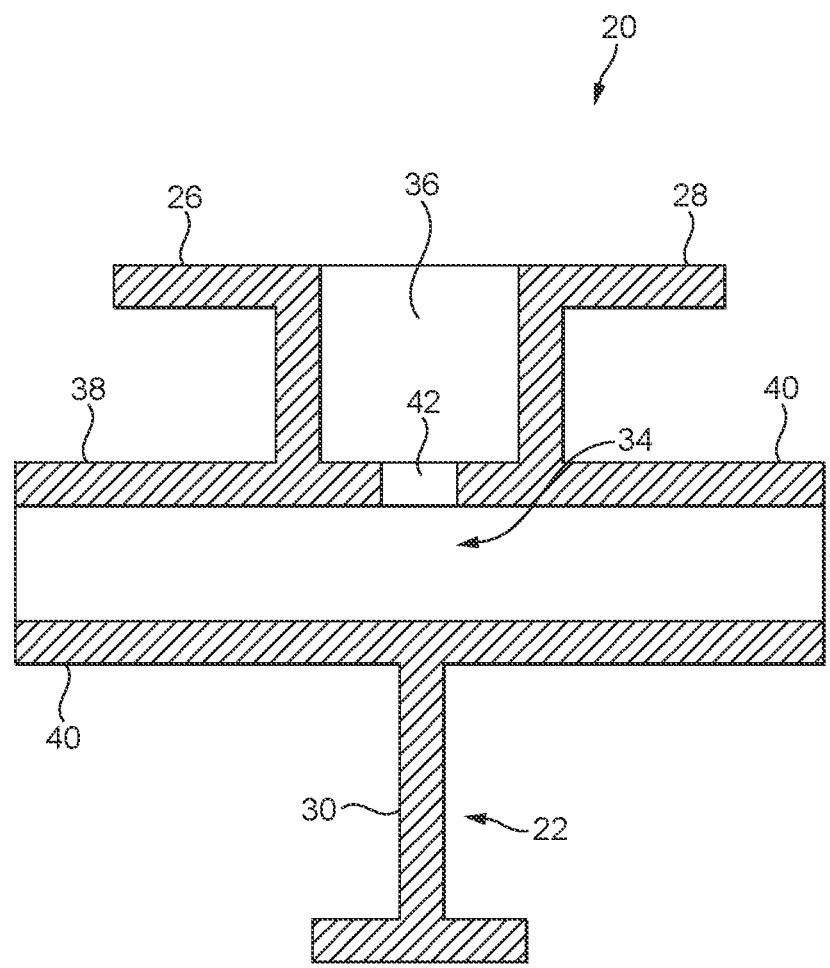
FIG. 4 schematically shows a cross-sectional view through the wing rib of FIG. 1.

Referring to FIGS. 3 and 4, each leading edge structural wing rib 20 comprises a main structural rib section 22 comprising a body portion 30 within which the length direction of the rib 20 lies. The body portion 30 is provided with cut-outs 32 to reduce the weight of the rib 20. The structural rib section 22 is also provided with a rear flange 24 for attaching the rib 20 to the leading edge spar 16, and first and second flanges 26, 28 which are arranged to support the wing skin 18 and to which the wing skin 18 can be attached. The first and second flanges 26, 28 are laterally spaced from one another in the width direction of the rib 20 and extend in a direction that is parallel to a plane within which the length direction of the rib 20 lies. The first and second flanges 26, 28 are curved so as to define the shape of the leading edge 12 of the wing 10.

The structural wing rib 20 also comprises a suction conduit 34 which, as will be explained below forms part of an HLFC system and, in use is fluidically coupled to a source of negative pressure so as to apply suction to the outer surface of the wing skin 18. The suction conduit 34 comprises an open U-shaped channel 36 connected to a duct 38. The open channel 36 is part of the rib 20 and is defined by the lateral spacing of the first and second flanges 26, 28. The open channel 36 is therefore provided in the upper outer surface of the wing rib 20 towards the leading edge. The channel 36 extends in a direction substantially parallel to a plane within which the length direction of the rib 20 lies (i.e. it extends in a direction parallel to the direction of extent of the flanges). The channel 36 is curved along its length, and is provided in the leading edge region of the rib 20. The duct 38 is part of the rib 20 and is in the form of a tubular member that extends through the structural section 22, in particular the body portion 30. The duct 38 extends in a direction parallel to the width direction of the rib 20 and therefore extends in a direction perpendicular to the direction of extent of the open channel 36. Each end of the duct 38 is provided with a duct coupling 40 (which forms a port) to which the corresponding coupling of a suction pipe section can be connected. The duct couplings 40 could be in the form of connectors, or in a basic arrangement could simply be the end of the duct 38 to which a pipe section could be welded or otherwise connected. A through-hole 42 is provided which fluidically connects the open channel 36 and the duct 38 to form the suction conduit 34 of the rib 20.

In this embodiment the wing rib 20 is an integrally formed component. The wing rib 20 could be formed by an additive manufacturing process as a single piece, but in other embodiments it could be cast or machined as a single piece. Further, it should be appreciated that in other embodiments the wing rib 20 could be formed by fabricating it from a number of separately manufactured parts.

Figure 5:
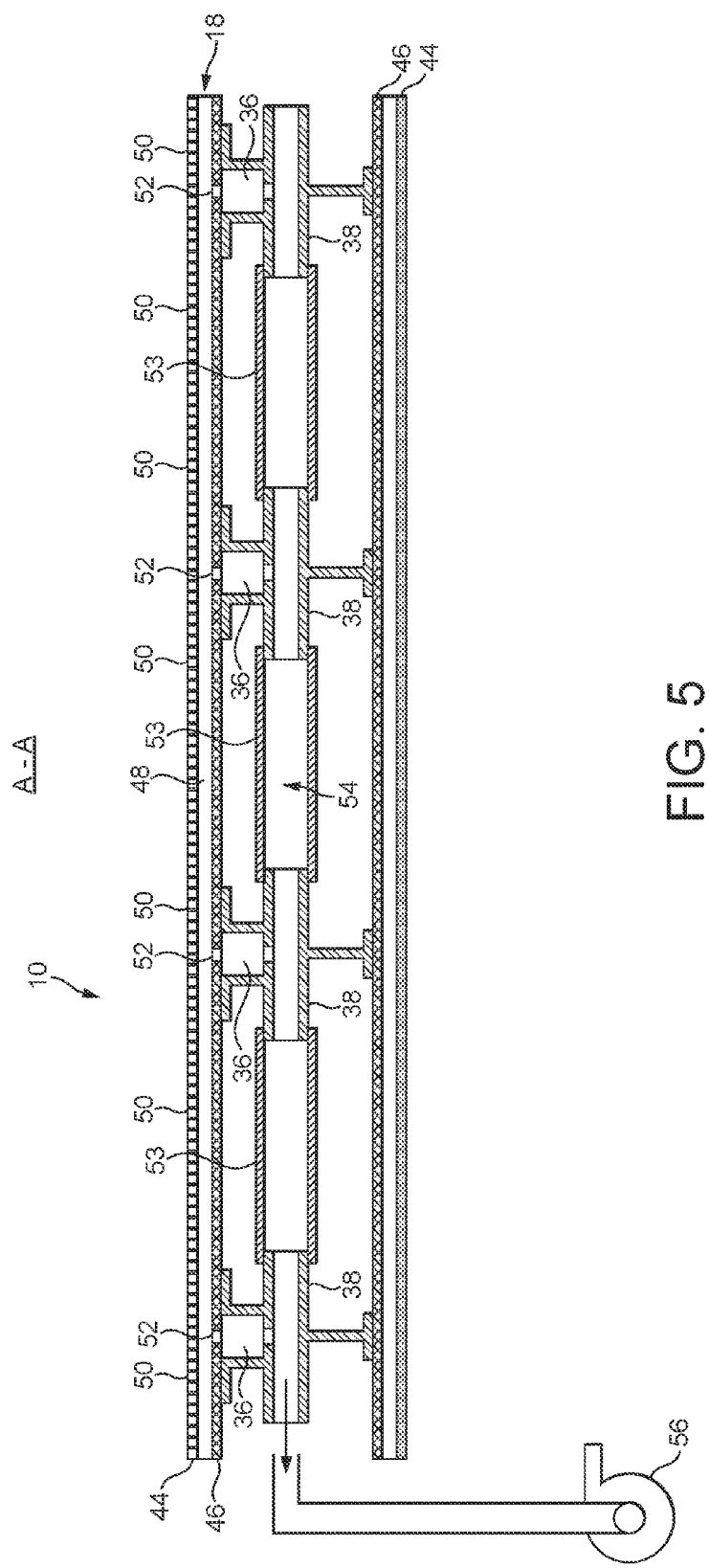
FIG. 5 schematically shows a cross-sectional view through the wing of FIG. 1 along the line A-A.

As shown in FIG. 5, the leading edge wing ribs 20 are fixed to the leading edge spar such that they are laterally spaced from one another. The wing skin 18 is supported by the ribs 20, in particular, the wing skin 18 is attached to the first and second flanges 26, 28 of the ribs 20. When attached, the wing skin 18 closes the open channel 36 of each wing rib 20. In this embodiment, the wing skin 18 comprises an outer layer 44 and an inner layer 46 that are separated by a number of dividers, such as stringers, to define a plurality of separated suction chambers 48. The suction chambers 48 are separated from one another and each generally extends in the spanwise direction. A plurality of suction holes 50 are provided that extend through the entire thickness of the outer layer 44. These suction holes 50, or openings, provide fluid communication between the ambient surroundings and a suction chamber 48. The suction holes 50 may have a diameter in the region of 60 µm. The holes 50 are distributed over the outer layer 44 and are provided in the leading edge region of the wing 10 in areas where it is desirable to generate suction to stabilise the laminar boundary layer. Each spanwise suction chamber 48 intersects (or passes over) the channels 36 of a number of wing ribs 20. In this embodiment, at an intersection a metering hole 52 is provided that extends through the entire thickness of the inner layer 46 of the wing skin 18. The metering holes 52 may have a diameter in the region of 10-20 mm. However, it should be appreciated that in other embodiments the diameter of the holes may be outside of this range. The diameter of the metering holes 52 is chosen so as to permit the required airflow rate. These metering holes 52 provide fluid communication between a spanwise suction chamber 48 and a suction conduit 34 of wing rib 20. To summarise, each spanwise chamber 48 has one or more metering holes 52, each opening into an intersecting suction conduit 34, and each suction conduit 34 has a number of metering holes 52 opening into it, from the various spanwise chambers 48 intersecting it.

The suction conduits 34 of all of the wing ribs 20 are fluidically connected together via suction pipe sections 53 disposed between adjacent wing ribs 20. Each suction pipe section 53 is provided with a coupling at each end, and these couplings cooperate with the couplings 40 of the ducts 38 of adjacent wing ribs to fluidically connect adjacent ducts 38. In this embodiment the couplings of the suction pipe sections 53 are flexible. This may assist in the construction of the wing 10, and may minimise stresses between the pipe sections 53 and the ribs 20. As can be seen from FIG. 5, the ducts 38 and suction pipe sections 53 form a continuous suction channel 54 extending through the wing ribs 20 parallel to the spar 16. It should be appreciated that in other embodiments each suction channel 54 (or other form of suction conduit) could have an individual port which is directly coupled to a source of negative pressure. This suction channel 54 is connected to a source of negative pressure, which in this embodiment is a turbocompressor 56. The term "negative pressure" is used to refer to the pressure being less than the pressure at the outer surface of the wing skin 18. Although not shown in FIG. 5, it should be appreciated that one end of the suction channel 54 is sealed. Further, any suitable source of pressure could be used. For example, the pressure could be a region of low pressure (i.e. lower than the pressure at the outer surface of the wing skin) in the airframe. The arrangement of the source of pressure, the suction pipe sections, the suction conduits formed in the wing ribs, and the dual-layer wing skin with suction holes and metering holes forms a hybrid laminar flow control (HLFC) system which allows suction (i.e. pressure lower than the pressure at the outer surface of the wing skin) to be applied to the wing skin surface so as to stabilise the laminar boundary layer.

In use, the turbocompressor 56 is operated to generate a pressure that is lower than the pressure at the outer surface of the wing skin 18 (i.e. suction). This may be referred to as a negative pressure. In other words, a negative pressure gradient is generated between the outer surface of the wing skin at the source of pressure. This causes a low or reduced pressure to be generated in the suction conduits 34 formed in all of the wing ribs 20 (the suction conduits 34 being fluidically connected by the suction pipe sections 53). This in turn results in a negative pressure (with respect to the pressure at the outer surface of the wing skin 18) within the spanwise suction chambers 48, causing air to be drawn through the suction holes 50 provided in the leading edge region of the outer layer 44 of the wing skin 18. Therefore, operation of (but not exclusively) the turbocompressor 56 results in suction being applied to the wing skin surface in the region of the leading edge so as to stabilise the laminar boundary layer and delay boundary layer transition. This may help to reduce drag and hence fuel consumption and emissions.

Incorporating the suction conduits into the structural wing ribs 20 minimises the space that the hybrid laminar flow control system occupies in the leading edge of the wing. Space in the leading edge of the wing is at a premium since high-lift devices and other systems are also incorporated within this region. Further, weight savings can be achieved by incorporating the suction conduits into the structure of the wing ribs, as opposed to forming separate suction conduits.

As opposed to forming suction channels in the wing ribs, channels could be formed in the wing skin, or between the wing skin and the ribs. In such an arrangement, these channels would be in fluid communication with the suction conduits of the ribs.

We claim:

1. An aircraft wing rib, comprising:
   a structural rib section to which a wing skin can be attached; and
   a suction conduit configured such that, in use, an application of a negative pressure causes air to be drawn through suction holes provided in an outer surface of the wing skin,
   wherein the suction conduit comprises an open channel configured to be closed by the attachment of the wing skin to the structural rib section, and
   wherein the structural rib section comprises two laterally spaced wing skin flanges configured to attach the wing skin to the structural rib section, and
   wherein the open channel is located between the two laterally spaced wing skin flanges.

2. The wing rib according to claim 1, wherein the suction conduit has a port arranged to be fluidically coupled to a source of negative pressure.

3. The wing rib according to claim 1, wherein the open channel is defined by the structural rib section.

4. The wing rib according to claim 1, wherein the suction conduit further comprises a duct in fluid communication with the open channel and arranged to be fluidically coupled to a source of negative pressure.

5. The wing rib according to claim 4, wherein the duct extends in a direction substantially parallel to a width direction of the wing rib.

6. The wing rib according to claim 4, wherein the duct comprises two duct couplings, one on either side of the structural rib section, to which a corresponding coupling of a suction pipe can be connected.

7. The wing rib according to claim 1, wherein the wing rib is at least one of: an integrally formed component; and is manufactured by an additive manufacturing process.

8. An aircraft wing comprising:
   at least one wing spar;
   a plurality of wing ribs, attached to the at least one wing spar; each wing rib comprising:
   a structural rib section; and
   a suction conduit; and
   a wing skin attached to the structural rib sections of the wing ribs, the wing skin having a plurality of suction holes in an outer surface thereof and wherein each suction hole is in fluid communication with a suction conduit of at least one wing rib, wherein the suction conduit comprises an open channel closed by the attachment of the wing skin to the structural rib section, wherein the structural rib section comprises two laterally spaced wing skin flanges attaching the wing skin to the structural rib section, and wherein the open channel is located between the two laterally spaced wing skin flanges.

9. The aircraft wing according to claim 8, wherein the suction conduits of the wing ribs are in fluid communication with one another.

10. The aircraft wing according to claim 9, wherein the suction conduits of each adjacent pair of wing ribs are fluidically coupled together with a suction pipe section located between adjacent wing ribs.

11. The aircraft wing according to claim 10, wherein the suction conduit of each wing rib comprises a duct which extends through the structural rib section.

12. The aircraft wing according to claim 11, wherein the suction pipe sections and the ducts form a continuous suction channel which can be fluidically coupled to a source of negative pressure.

13. The aircraft wing according to claim 12, wherein the end of each duct is provided with a duct coupling, and wherein the end of each suction pipe section is provided with a coupling which is coupled to a respective duct coupling.

14. The aircraft wing according to claim 8, wherein the wing skin comprises an outer layer and an inner layer defining at least one suction chamber therebetween, wherein the suction holes are provided in the outer layer, and wherein the inner layer comprises a plurality of metering holes, each opening into a suction conduit.

15. The aircraft wing according to claim 14, wherein the wing skin defines a plurality of separated suction chambers, each suction chamber extending in a spanwise direction.

16. The aircraft wing according to claim 15, wherein each suction chamber is provided with a plurality of metering holes in the inner layer, each metering hole opening into a separate suction conduit.

17. The aircraft wing according to claim 15, wherein a plurality of suction holes open into each suction chamber.

18. An aircraft wing comprising:
at least one wing spar;
a plurality of wing ribs attached to the at least one wing spar, each of the plurality of wing ribs including: a structural rib section; and
a suction conduit comprising an open channel and a duct extending though the structural rib section in a direction substantially parallel to a width direction of the wing rib;
wherein the ducts of adjacent wing ribs are coupled together with a suction pipe section so as to form a continuous suction channel; and a wing skin attached to the wing ribs so as to close the open channels, the wing skin having a plurality of suction holes in an outer surface thereof, each suction hole being in fluid communication with the open channel of at least one wing rib, wherein the structural rib section comprises two laterally spaced wing skin flanges attaching the wing skin to the structural rib section, and wherein the open channel is located between the two laterally spaced wing skin flanges.

19. An airfoil on an aircraft comprising:
a leading edge section including a wing skin forming a leading edge of the airfoil and extending aft of the leading edge from both sides of the airfoil, wherein the leading edge extends in a spanwise direction of the airfoil;
a spar housed within the wing skin, oriented in the spanwise direction, aft of the leading edge and spanning between opposing sections of the wing skin;
a wing rib spanning between the opposing sections of the wing skin, attached to and extending forward of the spar, wherein the wing rib includes an outer surface attached to the wing skin along both of the opposing sections of the wing skin from the leading edge towards the spar;
a pair of laterally spaced wing skin flanges forming at least a portion of the outer surface of each of the wing ribs;
a channel between the pair of laterally spaced wing skin flanges and in the outer surface of the wing rib; the channel is closed by the attachment of the outer surface to the wing skin, wherein the channel is configured to form a reduced pressure air region to allow a portion of air flowing across an outer surface of the wing skin to enter the channel; and
a duct in fluid communication with the channel and housed within the wing skin,
wherein the wing skin is porous and pores in the wing skin are in fluid communication with the channel.

20. The airfoil of claim 19, wherein the airfoil is a wing of the aircraft.

21. The airfoil of claim 19, wherein the duct extends through the wing rib.

22. The airfoil of claim 19, wherein the wing rib includes a body section which is a plate extending perpendicular to the spar and the wing skin.

23. The airfoil of claim 22, wherein the wing rib includes a flange at a rear edge of the body section, wherein the flange is attached to the spar.

24. The airfoil of claim 19, wherein the wing skin includes an outer layer including the pores, an inner layer which closes the channel, and a suction air chamber sandwiched between the inner and outer layers.

* * * * *